UNITED STATES PATENT OFFICE.

LEONARD L. POLLARD, OF WORCESTER, MASSACHUSETTS.

IMPROVEMENT IN HAND-VISES.

Specification forming part of Letters Patent No. 166,553, dated August 10, 1875; application filed May 25, 1875.

*To all whom it may concern:*

Be it known that I, LEONARD L. POLLARD, of the city and county of Worcester and State of Massachusetts, have invented certain new and useful Improvements in Handle-Vises; and I do hereby declare that the following is a full, clear, and exact description of the same, reference being had to the accompanying drawings which form a part of this specification, and in which—

Figure 1 represents a handle-vice constructed in accordance with my invention. Fig. 2 represents a longitudinal section of the same at line X X, Fig. 1; and Fig. 3 represents a transverse section of the same at line Y Y, Fig. 1.

This invention has relation to that class of devices known as handle-vises, wherein the pivoted jaws are operated by the adjustment of the handle, or rotation of the same upon the screw-threaded end of the shank; and my invention consists in forming the upper portion of such shank cylindrical and smooth for a distance equal to, or greater than, the longitudinal movement of the handle; also, in forming the upper end of the handle, above the screw-threaded portion, with a recess of sufficient size to correspond with the smooth and cylindrical part of the shank, to insure a close-fitting joint between them, and thereby prevent the danger of any dust or filings getting between and destroying the action of the screw-threads.

In the drawings, A A denote the jaws, pivoted between the ears $b\ b$ of the shank B, and pressed outward by springs $a\ a$, while C indicates the handle, provided with the conical end $d$, for operating the jaw A when said handle is turned on the screw B′ of the shank. The upper portion B of the shank I form cylindrical and smooth for a distance equal to, or greater than, the distance of longitudinal movement of the handle C when closing the jaws A, the screw or threaded part B′ being at the end of the shank. I also form a recess, E, in the end of the handle C, of a size to correspond with the cylindrical part of the shank, so that the shank and handle will fit to each other with a smooth, close joint at the outer end, while the screw-threaded portions are completely encased within the handle, as shown.

By constructing the parts as above described, all dust and filings are excluded from the screw-threads, and prevented from interfering with the free and perfect action of the parts, while the shank B is strengthened along that portion unsupported by the handle, and is less liable to become bent when in use, thus rendering the tool much more efficient and serviceable than heretofore.

Having described my improvement, what I claim as new, and desire to secure by Letters Patent, is—

The hand-vise herein described, consisting of the pivoted jaws A A, springs $a\ a$, and screw-shank B, the upper part thereof formed smooth, to fit with a close joint into a recess, E, in the handle C, said handle having a conical end, $d$, for operating the jaws, substantially as and for the purpose set forth.

LEONARD L. POLLARD.

Witnesses:
CHAS. H. BURLEIGH,
JOHN E. SINCLAIR.

C. H. RAUERT.
Vent-Faucet.
No. 166,554. Patented Aug. 10, 1875.
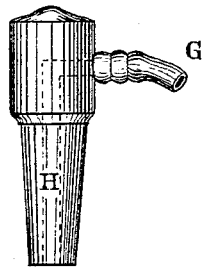
Fig. 1.
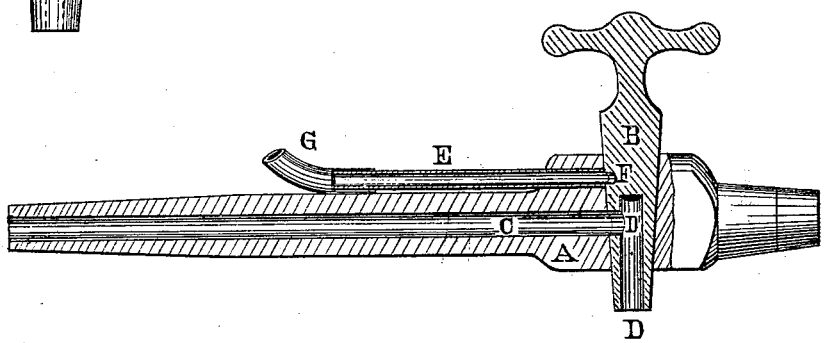
Fig. 2.
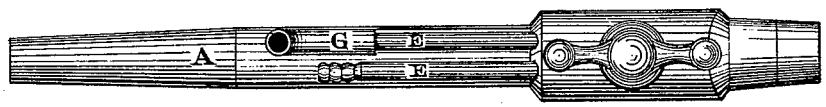
WITNESSES:
Wm. H. Dopp.
F. Hirsch.
INVENTOR:
Charles H. Rauert
by Michael J. Stark
his Attorney